US011360486B2

(12) United States Patent
Perez Barrera et al.

(10) Patent No.: US 11,360,486 B2
(45) Date of Patent: Jun. 14, 2022

(54) VEHICLE ASSISTANCE (71) Applicant: Ford Motor Company, Dearborn, MI (US)

(72) Inventors: Oswaldo Perez Barrera, Texcoco (MX); Alvaro Jimenez Hernandez, Mexico City (MX)

(73) Assignee: FORD MOTOR COMPANY, Dearborn, MI (US)

( * ) Notice: Subject to any disclaimer, the term of this patent is extended or adjusted under 35 U.S.C. 154(b) by 291 days.

(21) Appl. No.: 16/461,915

(22) PCT Filed: Nov. 22, 2016

(86) PCT No.: PCT/US2016/063242
§ 371 (c)(1),
(2) Date: May 17, 2019

(87) PCT Pub. No.: WO2018/097814
PCT Pub. Date: May 31, 2018

(65) Prior Publication Data
US 2019/0278296 A1 Sep. 12, 2019

(51) Int. Cl.
G05D 1/02 (2020.01)
G05D 1/00 (2006.01)
(Continued)

(52) U.S. Cl.
CPC ......... *G05D 1/0276* (2013.01); *G05D 1/0088* (2013.01); *G05D 1/0212* (2013.01);
(Continued)

(58) Field of Classification Search
CPC .............. G05D 1/0276; G05D 1/0088; G05D 1/10212; G05D 2201/0213; H04W 4/024; H04W 4/029; H04W 4/40
See application file for complete search history.

(56) References Cited

U.S. PATENT DOCUMENTS 7,312,712 B1  12/2007  Worrall
8,803,920 B2  8/2014  Kalai et al.
(Continued)

FOREIGN PATENT DOCUMENTS

CN  203528817 U  4/2014
CN  10184753 A  12/2016
(Continued)

OTHER PUBLICATIONS

International Search Report and Written Opinion dated Feb. 7, 2017 re Appl. No. PCT/US2016/063242.
(Continued)

*Primary Examiner* — Jelani A Smith
*Assistant Examiner* — Hana Lee
(74) *Attorney, Agent, or Firm* — Brandon Hicks; Bejin Bieneman PLC (57) ABSTRACT A computer is programmed to store a first vehicle location at which a user device is connected to a first network. The computer is further programmed to store a route of a host vehicle from the first vehicle location to a second vehicle location at which the user device cannot connect to the network. The computer is further programmed to move the host vehicle to the first vehicle location in response to the user device not connecting to a second network at a predetermined time.

20 Claims, 3 Drawing Sheets (51) Int. Cl.
  *H04W 4/40* (2018.01)
  *H04W 4/029* (2018.01)
  *H04W 4/024* (2018.01)

(52) U.S. Cl.
  CPC ........... *H04W 4/024* (2018.02); *H04W 4/029* (2018.02); *H04W 4/40* (2018.02); *G05D 2201/0213* (2013.01)

(56) References Cited

U.S. PATENT DOCUMENTS

| | | | |
|---|---|---|---|
| 8,948,738 B2 | 2/2015 | Bauchot et al. | |
| 8,983,682 B1 | 3/2015 | Peeters et al. | |
| 8,989,053 B1 | 3/2015 | Skaaksrud et al. | |
| 9,056,676 B1 | 6/2015 | Wang | |
| 9,349,290 B2 | 5/2016 | Zhang et al. | |
| 9,463,875 B2 | 10/2016 | Abuelsaad et al. | |
| 9,718,564 B1 | 8/2017 | Beckman et al. | |
| 9,841,757 B2 | 12/2017 | Mikan et al. | |
| 10,287,014 B2 | 5/2019 | Erickson et al. | |
| 10,926,876 B2 | 2/2021 | Kozak | |
| 2003/0146854 A1* | 8/2003 | Jones | G08G 1/123 340/988 |
| 2007/0265769 A1* | 11/2007 | Geelen | G01C 21/367 701/532 |
| 2008/0299939 A1 | 12/2008 | Apodaca et al. | |
| 2010/0198494 A1 | 8/2010 | Chao et al. | |
| 2011/0029229 A1* | 2/2011 | Hui | H04W 4/024 701/533 |
| 2011/0175724 A1 | 7/2011 | Kent | |
| 2011/0210835 A1* | 9/2011 | Kondo | G08G 1/205 340/425.5 |
| 2015/0126234 A1* | 5/2015 | Rodriguez | G08B 13/22 455/457 |
| 2015/0321758 A1 | 11/2015 | Sarna, II | |
| 2015/0370251 A1 | 12/2015 | Siegel et al. | |
| 2016/0330601 A1 | 11/2016 | Srivastava | |
| 2017/0325065 A1* | 11/2017 | Azam | H04W 4/20 |
| 2018/0039262 A1* | 2/2018 | Fox | H04B 7/18506 |
| 2018/0050800 A1 | 2/2018 | Boykin et al. | |
| 2018/0101173 A1 | 4/2018 | Banerjee et al. | |
| 2018/0321681 A1 | 11/2018 | Tu | |
| 2019/0043370 A1 | 2/2019 | Mulhall et al. | |
| 2019/0108472 A1 | 4/2019 | Sweeney et al. | |
| 2019/0114564 A1 | 4/2019 | Ferguson et al. | |
| 2019/0159037 A1 | 5/2019 | Byrne | |
| 2019/0278296 A1 | 9/2019 | Perez Barrera et al. | |
| 2020/0094957 A1 | 3/2020 | Sohmshetty et al. | |
| 2021/0070471 A1 | 3/2021 | Ahmed et al. | |
| 2021/0321277 A1 | 10/2021 | Murray et al. | |

FOREIGN PATENT DOCUMENTS

| | | |
|---|---|---|
| DE | 102015207979 A1 | 11/2016 |
| KR | 20160121862 A | 10/2016 |
| WO | 2015091637 A1 | 6/2015 |
| WO | 2018190748 A1 | 10/2018 |

OTHER PUBLICATIONS

Non-Final Office Action dated Dec. 21, 2021 re U.S. Appl. No. 16/491,615, filed Sep. 6, 2019.
Final Office Action dated Mar. 28, 2022 re U.S. Appl. No. 16/491,615, filed Sep. 6, 2019.

* cited by examiner

VEHICLE ASSISTANCE

BACKGROUND

An autonomous vehicle, i.e., a self-driving vehicle, operates according to instructions from a computer. Thus, the autonomous vehicle may travel to and from destinations with or without occupants.

DETAILED DESCRIPTION

Introduction

Figure 1:
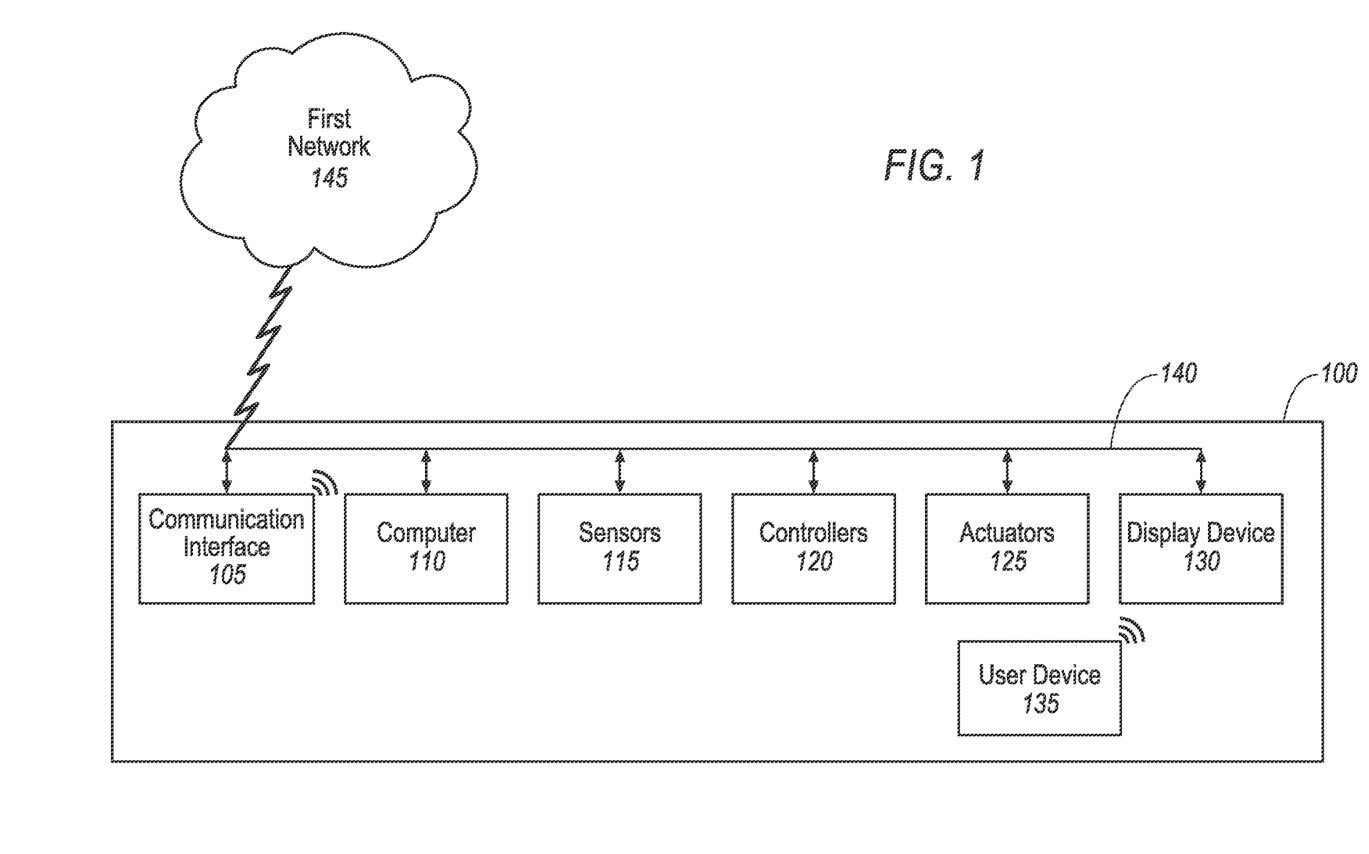
FIG. 1 is a block diagram of an example host vehicle including a computer.

A computer 110 of a host vehicle 100 is programmed to detect when a user device 135 associated with an occupant of the host vehicle 100 loses a connection with a first network 145. The computer 110 is further programmed to store a first vehicle location at which the user device 135 was connected to the first network 145, and a route of the host vehicle 100 from the first vehicle location to a second vehicle location at which the user device 135 cannot connect to the first network 145. The computer 110 is further programmed to move the host vehicle from the second vehicle location to the first vehicle location in response to the user device 135 not connecting to a second network at a predetermined time. In this way, the computer 110 can be programmed to transmit a notification via the first network 145 upon returning to the first vehicle location.

FIG. 1 is a block diagram of the host vehicle 100. The host vehicle 100 includes a communication interface 105, the computer 110, sensors 115, controllers 120, actuators 125, and a display device 130, e.g., a human machine interface (HMI), in communication with each other over a vehicle communication network 140, each of which is discussed in more detail below.

As further shown in FIG. 1, the user device 135 may be located in the host vehicle 100. The user device 135 may be any variety of mobile device that includes a processor and a memory, such as a personal computer (e.g., a laptop computer, a tablet, etc.), a smartphone, a personal digital assistant, a portable media player, wearable devices such as smart watches, and/or any other suitable mobile computing device. The occupant of the host vehicle 100 may take the user device 135 from the host vehicle 100 when the occupant exits the host vehicle 100.

System Elements

The host vehicle 100 may be powered in variety of known ways, e.g., with an electric motor and/or internal combustion engine. The host vehicle 100 includes the communication interface 105, the computer 110, sensors 115, controllers 120, actuators 125, the display device 130, the vehicle communication network 140, and other components discussed below.

The communication interface 105 includes an antenna, circuits, chips, or other electronic components. The communication interface 105 can be programmed to facilitate communications via the first network 145. The first network 145 is a wireless (e.g., cellular, WiMAX, satellite, microwave, and radio frequency) communication network. For example, as further discussed below, the communication interface 105 can communicate with various electronic devices, e.g., the user device 135, via a second network. In this way, when the user device 135 is paired with the communication interface 105 via the second network, the communication interface 105 can be programmed to detect when the user device 135 is connected to the first network 145. The communication interface 105 may thereafter output a signal to the computer 110, e.g., over the vehicle communication network 140, indicating that the user device 135 is connected to the first network 145 of the host vehicle 100.

As discussed above, the communication interface 105 can communicate with various electronic devices, e.g., the user device 135, via the second network. The second network may be wired (e.g., via Universal Serial Bus (USB), Mobile High Definition Link (MHL), High Definition Multimedia Interface (HDMI), etc.) and/or wireless (e.g., Bluetooth®, Bluetooth® Low Energy, WiFi, Near-Field Communication (NFC), etc.). The communication interface 105 may be programmed to facilitate wired and wireless communications via the second network between, e.g., the computer 110 of the host vehicle 100 and the user device 135. Thus, communications received from the user device 135 may be forwarded to the computer 110, and communications from the computer 110 can be forwarded to the user device 135.

Moreover, when the user device 135 is near the host vehicle 100, the user device 135 can pair with the communication interface 105 via the second network. The communication interface 105 may thereafter output a signal to the computer 110, e.g., over the vehicle communication network 140, indicating that the user device 135 is connected to the second network of the host vehicle 100.

The communication interface 105 may be further programmed to communicate with various components of the host vehicle 100, such as the computer 110, sensors 115, controllers 120, actuators 125, and the display device 130. The communication interface 105 may be programmed to communicate with the vehicle components in accordance with any number of wireless communication protocols such as Bluetooth®, Bluetooth® Low Energy, WiFi, NFC, etc. Additionally or alternatively, the communication interface 105 may be programmed to communicate with the vehicle components over the vehicle communication network 140 via a controller area network (CAN), Ethernet, Local Interconnect Network (LIN), or other wired communication protocols.

The computer 110 includes a processor and a memory, as are known. The memory includes one or more forms of computer-readable media, and stores instructions executable by the computer 110 for performing various operations, including those disclosed herein.

The computer 110 may operate the host vehicle 100 in an autonomous or semi-autonomous mode. For purposes of this disclosure, an autonomous mode is one in which the computer 110 controls propulsion (e.g., via a powertrain including an electric motor and/or an internal combustion engine), braking, and steering of the host vehicle 100. In a semi-autonomous mode, the computer 110 controls one or two of the propulsion, braking, and steering of the host vehicle 100.

The computer 110 may include programming to operate one or more of the propulsion (e.g., control of acceleration in the vehicle by controlling one or more of an internal combustion engine, electric motor, hybrid engine, etc.), braking, and steering of the host vehicle 100. The computer 110 may be further programmed to operate climate control, interior and/or exterior lights, etc., as well as to determine whether and when the computer 110, as opposed to a human operator, is to control such operations.

The computer 110 may be generally arranged for communications on the vehicle communication network 140. The computer 110 may include or be communicatively coupled, e.g., via the vehicle communication network 140, to more than one processor, e.g., controllers 120 and the like included in the host vehicle 100 for monitoring and/or controlling various subsystems such as a powertrain, brake, steering, etc.

Via the vehicle communication network 140, the computer 110 may transmit data to and/or receive data from various components in the host vehicle 100, e.g., the communication interface 105, sensors 115, controllers 120, actuators 125, the display device 130, etc. Alternatively or additionally, in cases where the computer 110 comprises multiple devices, the vehicle communication network 140 may be used for communications between devices represented as the computer 110 in this disclosure. Further, as mentioned below, various sensors 115 and/or controllers 120 may provide data to the computer 110 via the vehicle communication network 140.

In addition, the computer 110 may be programmed for communicating via the communication interface 105 via the first network 145. In this way, the computer 110 can be programmed to transmit and/or receive communications via the first network 145.

As discussed above, generally included in instructions stored in the memory and executed by the computer 110 is programming for operating one or more vehicle components, e.g., braking, steering, propulsion, etc., without intervention of a human operator. Using data received in the computer 110, e.g., data from sensors 115, etc., the computer 110 may make various determinations and/or control various vehicle components and/or operations without a driver to operate the vehicle.

For example, the computer 110 may include programming to regulate vehicle operational behaviors such as speed, acceleration, deceleration, steering, etc., as well as tactical behaviors such as a distance between vehicles and/or amount of time between vehicles, lane-change minimum gap between vehicles, left-turn-across-path minimum, time-to-arrival at a particular location, intersection (without signal) minimum time-to-arrival to cross the intersection, etc.

Sensors 115 can include a variety of devices known to provide data via the vehicle communication network 140, or via other suitable interfaces such as are known. For example, the sensors 115 may include one or more cameras, radars, and/or Light Detection and Ranging (LIDAR) sensors disposed in the host vehicle 100 providing data encompassing at least some of the vehicle exterior. The data may be received by the computer 110 via, e.g., the vehicle communication network 140.

The sensors 115 can include a GPS (global positioning system) device. The GPS device may transmit current geographical coordinates of the host vehicle 100 via the vehicle communication network 140 to, e.g., the computer 110.

Controllers 120, as that term is used herein, are processors that typically are programmed to control a specific vehicle subsystem. Examples include a powertrain controller, a brake controller, and a steering controller. A controller may be an electronic control unit (ECU) such as is known, possibly including additional programming as described herein. The controllers 120 may communicatively be connected to and receive instructions from the computer 110 to actuate the subsystem according to the instructions. For example, a brake controller may receive instructions from the computer 110 via the vehicle communication network 140 to operate the brakes of the vehicle.

The actuators 125 include circuits, chips, or other electronic components that can actuate various vehicle subsystems in accordance with appropriate control signals as is known. For instance, the actuators 125 may include one or more relays, servomotors, etc. The actuators 125 may therefore be used to control braking, acceleration, and steering of the host vehicle 100. The control signals used to control the actuators 125 may be generated by the computer 110, or a control unit located in the host vehicle 100, e.g., the brake controller, etc.

The display device 130, e.g., an HMI, can include a touch screen, an interactive voice response (IVR) system, and/or other input/output mechanisms such as are known, and can receive input data from an occupant of the host vehicle 100 and/or output data to the display device 130 from, e.g., the computer 110. The display device 130 may communicate with and receive communications from the computer 110 via, e.g., the vehicle communication network 140.

The user device 135 may be any variety of mobile device that includes a processor and a memory, such as a personal computer (e.g., a laptop computer, a tablet, etc.), a smartphone, a personal digital assistant, a portable media player, wearable devices such as smart watches, and/or any other suitable mobile computing device.

The user device 135 can communicate with other electronic devices, including, e.g., the computer 110 of the host vehicle 100 via the second network of the communication interface 105, as discussed above. The user device 135 may transmit certain identifiers that are unique to each user device 135. For example, the identifiers may include a MAC Address, an International Mobile Equipment Identifier (IMEI), an Electronic Serial Number (ESN), a Mobile Equipment Identifier (MEID), a Mobile Directory Number (MDN), a Mobile Identification Number (MIN), a Mobile Subscription Identification Number (MSIN), an International Mobile Subscriber Identification number (IMSI), a static or dynamic IP address, an email address, and the like.

The computer 110 may be programmed to associate one or more user devices 135 with occupants of the host vehicle 100. For example, identifiers associated with user devices 135 of the occupants can be stored in the memory of the computer 110. In this way, when the user device 135 having identifiers associated with occupants pairs with the communication interface 105 via the second network, the computer 110 can associate those user devices 135, as well as communications from the user device 135, with the occupant. In addition, the computer 110 can be programmed to transmit communications to the user device 135 associated with the occupant.

Exemplary Process Flow

Figure 2A:
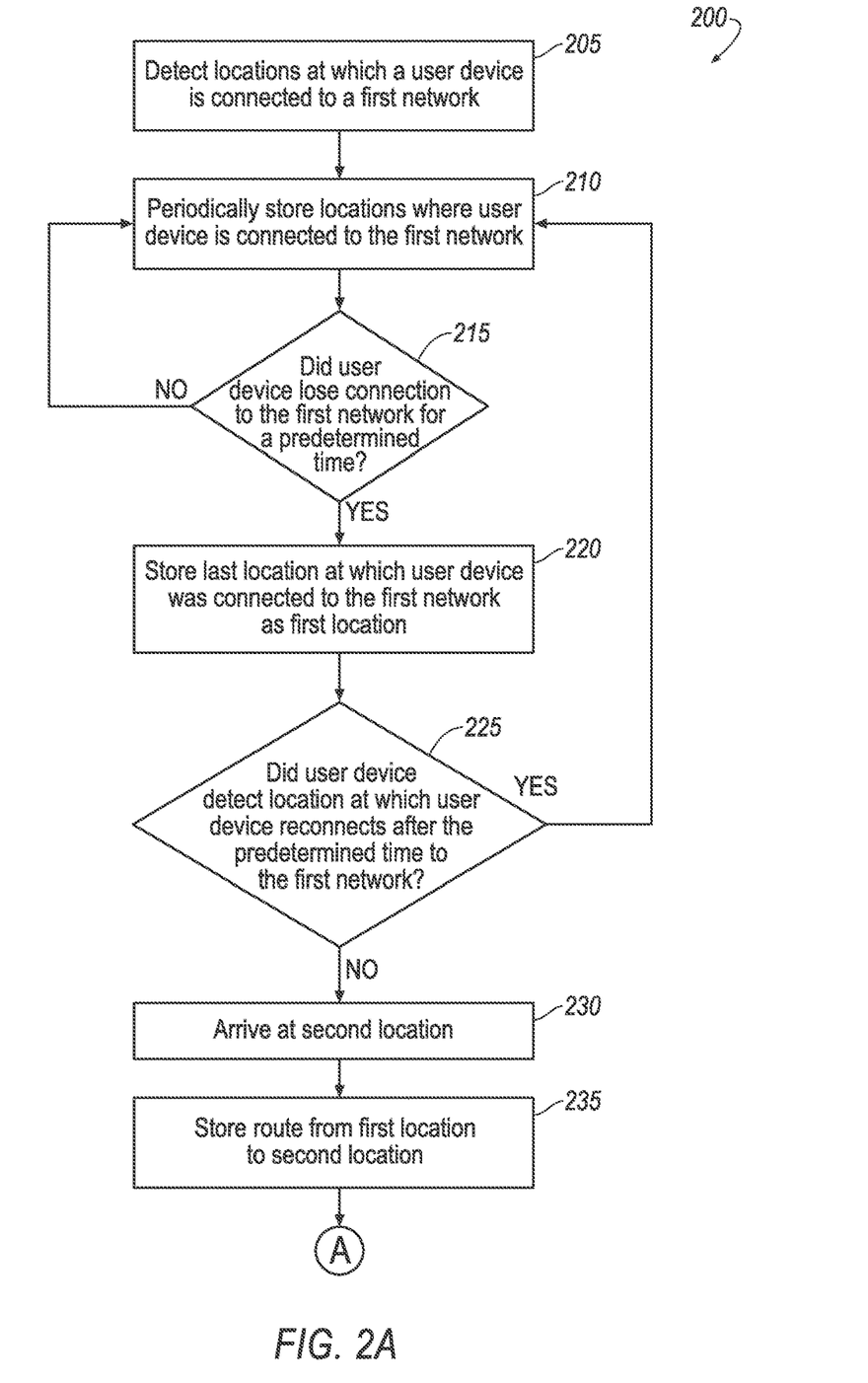
FIGS. 2A and 2B are a flowchart of an example process for the computer.
Figure 2B:
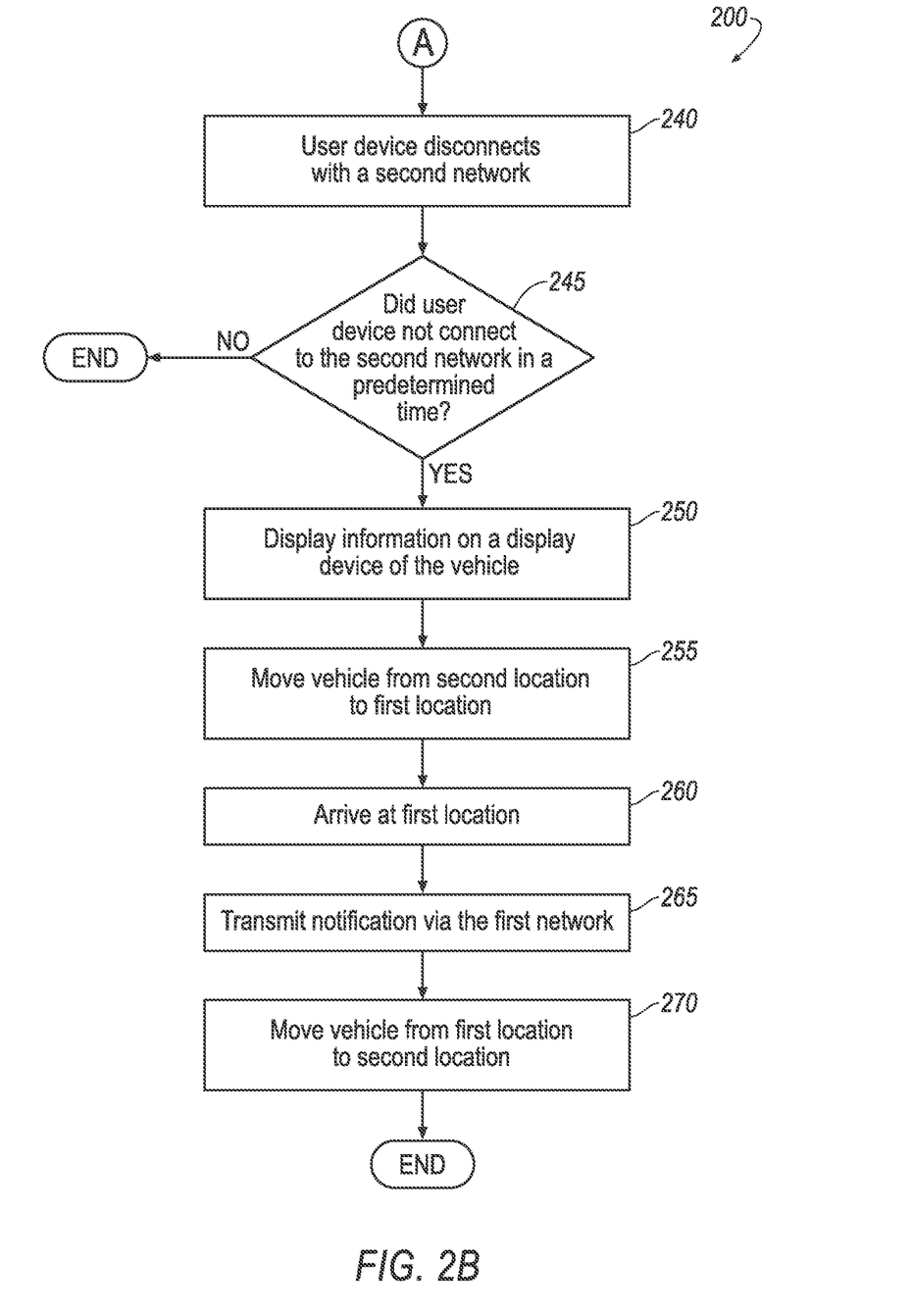

FIGS. 2A and 2B illustrate an example process 200 that may be executed by the computer 110 of the host vehicle 100.

The process begins in a block 205. At the block 205, the computer 110 of the host vehicle 100 detects locations at which the user device 135 is connected to the first network 145. For example, as discussed above, the user device 135 can be paired with the communication interface 105 via the second network. In this way, the communication interface 105 can detect when the user device 135 is connected to the first network 145. The communication interface 105 can output a signal to the computer 110, e.g., over the vehicle communication network 140, indicating that the user device 135 is connected to the first network 145. Following the block 205, the process 200 proceeds to a block 210.

In the block 210, the computer 110 is programmed to periodically store, e.g., at five-minute intervals, locations at which the user device 135 is connected to the first network 145. As discussed above, the sensors 115 of the host vehicle 100 can include a GPS device. The GPS device can transmit current geographical coordinates of the host vehicle 100 to the computer 110 via the vehicle communication network 140. Thus, the computer 110 can be programmed to periodically store the geographic coordinates of the host vehicle 100 at which the user device is connected to the first network 145. The computer 110 may store the geographical coordinates of the host vehicle 100 in, e.g., the memory of the computer 110. Following the block 210, the process 200 proceeds to a decision block 215.

In the decision block 215, the computer 110 is programmed to determine whether the user device 135 loses the connection with the first network 145 for a predetermined time, e.g., 10 minutes. Again, the user device 135 can be paired with the communication interface 105 via the second network. Thus, the communication interface 105 can detect when the user device 135 is connected to the first network 145, and output a signal to the computer 110 indicating that the user device 135 is connected to the first network 145. In the event the computer 110 stops receiving the connection signal from the communication interface 105 for the predetermined time, the process 200 proceeds to a block 220. In the event the computer 110 receives the connection signal from the communication interface 105 before the predetermined time, the process 200 returns to the block 210.

In the block 220, the computer 110 is programmed to store as a first location a last location of the host vehicle 100 at which the user device 135 was connected to the first network 145 before detecting the user device lost the connection to the first network 145 for the predetermined time. As discussed above, in the block 210, the computer 110 is programmed to periodically store locations of the host vehicle 100 at which the user device 135 is connected to the first network 145. For example, the computer 110 can store in its memory the geographical coordinates of the host vehicle 100 at those locations as provided to the computer 110 by the GPS device via the vehicle communication network 140. In the block 220, the computer 110 can store as the first location the geographical coordinates of the last location of the host vehicle 100 at which the user device was connected to the first network 145 before the predetermined time passed. Following the block 220, the process 200 proceeds to a decision block 225.

In the decision block 225, the computer 110 is programmed to determine whether the user device 135 detects a location at which the user device 135 reconnects to the first network 145 after the predetermined time. Again, the user device 135 can be paired with the communication interface 105 via the second network. Thus, the communication interface 105 can detect when the user device 135 is connected to the first network 145, and output a signal to the computer 110 indicating that the user device 135 is connected to the first network 145. In the event the computer 110 receives the connection signal from the communication interface 105 after not receiving the connection signal for the predetermined time, the process 200 returns to the block 210. In the event the computer 110 does not receive a connection signal after the predetermined time, the process 200 proceeds to a block 230.

In the block 230, the computer 110 is programmed to determine the host vehicle 100 has arrived at a second location. The computer 110 may be programmed to determine the host vehicle 100 has arrived at the second location if, e.g., an ignition switch of the host vehicle 100 has been turned off, the host vehicle 100 stops moving for a predetermined time, the host vehicle 100 has arrived at predetermined geographic coordinates, etc. Following the block 230, the process 200 proceeds to a block 235.

In the block 235, the computer 110 is programmed to store a route from the first location to the second location. As discussed above, in the block 220, the computer 110 can store as the first location the geographic coordinates of the last location of the host vehicle 100 at which the user device was connected to the first network 145 before the predetermined time passed. At the second location, the GPS can transmit current geographical coordinates of the host vehicle 100 to the computer 110 via the vehicle communication network 140. In this way, the route from the first location and the second location can be determined and stored in, e.g., the memory of the computer 110. From the block 235, the process 200 proceeds to a block 240.

In the block 240, the computer 110 detects whether the user device 135 disconnects with the second network. As discussed above, the user device 135 can pair with the communication interface 105 via the second network. The communication interface 105 can thereafter output a signal to the computer 110 indicating that the user device 135 is connected to the second network of the host vehicle 100. Thus, in the event the computer 110 stops receiving the connection signal, e.g., when an occupant takes the user device 135 outside the range of the second network, the computer 110 can detect that the user device 135 is disconnected from the second network. From the block 240, the process 200 proceeds to a decision block 245.

In the decision block 245, the computer 110 is programmed to determine whether the user device 135 does not connect with the second network in a predetermined time. The occupant may set the predetermined time before exiting the host vehicle 100 with the user device 135. For example, the occupant may set the predetermined time by inputting it through the display device 130. Alternatively or additionally, the occupant can set the predetermined time via the user device 135. In that regard, the communication interface 105 can be programmed to facilitate wired and wireless communications via the second network between the computer 110 and the user device 135. Thus, when the user device 135 is in communication with the computer 110, the occupant can input the predetermined time through the user device 135. In the event the user device 135 does not connect to the second network in the predetermined time, the process 200 moves to a block 250. In the event the user device 135 does connect to the second network in the predetermined time, the process 200 ends.

In the block 250, the computer 110 is programmed to display information on the display device 130 of the host vehicle 100. As discussed above, the display device 130 can be communicatively coupled to the computer 110 via the vehicle communication network 140. Thus, when the user device 135 does not connect with the second network for the predetermined time, the computer 110 can be programmed to display information about the occupant, e.g., the occupant's name, address and telephone number, in the event someone locates the host vehicle 100. From the block 250, the process 200 proceeds to a block 255.

In the block 255, the computer 110 is programmed move the host vehicle 100 from the second location to the first location. In the block 235, the computer 110 stored the route from the first location and the second location. Thus, the computer 110 can move the host vehicle 100 from the second location to the first location using the stored route.

Alternatively, the computer 110 can be programmed to store in its memory the geographic coordinates of the first and the second locations. In this way, the computer 110 can communicate those coordinates to the GPS device via, e.g., the vehicle communication network 140, and the GPS device can calculate a route from the second location to the first location. Following that, the GPS device can communicate the route to the computer 110 via the vehicle communication network 140, and the computer 110 can use the calculated route to move the host vehicle 100 from the second location to the first location. Following block 255, the process 200 proceeds to a block 260.

In the block 260, the computer 110 is programmed to determine the host vehicle 100 has arrived at the first location. The computer 110 may be programmed to determine the host vehicle 100 has arrived at the first location if, e.g., the host vehicle 100 has arrived at the geographic coordinates the computer has stored for the first location, etc. Following the block 260, the process 200 proceeds to a block 265.

In the block 265, the computer 110 is programmed to transmit a notification over the first network 145. As discussed above, the computer 110 can be programmed for communicating via the first network 145 via the communication interface 105. Thus, when the host vehicle 100 arrives at the first destination, i.e., a location where the user device 135 could connect to the first network 145, the computer 110 can transmit the notification via the first network 145. The computer 110 can be programmed to transmit the notification to authorities, with the notification providing the identity of the former occupant of the host vehicle 100, and indicating that the former occupant is missing. Alternatively or additionally, the computer 110 can be programmed to transmit a notification to an emergency contact stored in the memory of the computer 110. From the block 265, the process 200 proceeds to a block 270.

In the block 270, the computer 110 is programmed move the host vehicle 100 from the first location to the second location. Following the block 270, the process 200 ends.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:

1. A computer in a host vehicle comprising a processor and a memory, wherein the memory stores instructions executable by the processor such that the computer is programmed to:
   store in the memory a first vehicle location based on determining that a user device in the host vehicle is connected to a first network at the first vehicle location, wherein the first network is a wireless communication network;
   determine that the host vehicle has arrived at a second vehicle location after determining that the user device cannot connect to the first network;
   store in the memory a route of the host vehicle from the first vehicle location at which the user device in the host vehicle was connected to the first network to the second vehicle location at which the user device cannot connect to the first network; and
   move the host vehicle to the first vehicle location based on the route in response to the user device not connecting to a second network at a predetermined time.

2. The computer of claim 1, wherein the computer is further programmed to:
   transmit a notification via the first network upon returning to the first vehicle location.

3. The computer of claim 2, wherein the computer is further programmed to:
   transmit the notification to a preselected contact.

4. The computer of claim 2, wherein the computer is further programmed to:

move the host vehicle from the first vehicle location to the second vehicle location after transmitting the notification.

5. The computer of claim 1, wherein the computer is further programmed to:
periodically store locations at which the user device is connected to the first network while the host vehicle is driving;
detect when the user device loses a connection to the first network; and
store as the first vehicle location a last vehicle location at which the user device was connected to the first network before detecting the user device lost the connection for a predetermined time.

6. The computer of claim 5, wherein the computer is further programmed to:
detect a location at which the user device reconnects with the first network after losing the connection with the first network for the predetermined time; and
store the location at which the user device reconnects with the first network as the first vehicle location.

7. The computer of claim 6, wherein the computer is further programmed to:
periodically store locations at which the user device is connected to the first network while the host vehicle is driving after detecting the location at which the user device reconnected with the first network; and
detect when the user device loses a connection to the first network; and
store as the first vehicle location a last vehicle location at which the user device was connected to the first network before detecting the user device lost the connection for a predetermined time.

8. The computer of claim 1, wherein the computer is further programmed to:
display information on a display device of the host vehicle after the predetermined time.

9. The computer of claim 1, wherein the computer is further programmed to:
set the predetermined time in response to an input from an occupant of the host vehicle.

10. A computer in a host vehicle comprising a processor and a memory, wherein the memory stores instructions executable by the processor such that the computer is programmed to:
periodically store locations at which a user device in the host vehicle is connected to a first network while theft host vehicle is driving, wherein the first network is a wireless communication network;
detect when the user device loses a connection to the first network;
store a first vehicle location based on determining a last vehicle location at which the user device was connected to the first network before detecting the user device lost the connection for a predetermined time;
determine that the host vehicle has arrived at a second vehicle location after determining that the user device cannot connect to the first network;
store in the memory a route of the host vehicle from the first vehicle location at which the user device in the host vehicle was connected to the first network to the second vehicle location at which the user device cannot connect to the first network; and
move the host vehicle to the first vehicle location from the second vehicle location based on the route in response to the user device not connecting to a second network at a predetermined time.

11. The computer of claim 10, wherein the computer is further programmed to:
detect a location at which the user device reconnects with the first network after losing the connection with the first network for the predetermined time;
periodically store locations at which the user device is connected to the first network while the host vehicle is driving after detecting the location at which the user device reconnected to the first network; and
detect when the user device loses a connection to the first network; and
store as the first vehicle location a last vehicle location at which the user device was connected to the first network before detecting the user device lost the connection for the predetermined time.

12. A method comprising:
storing in the memory a first vehicle location of a host vehicle based on determining that a user device in the host vehicle is connected to a first network at the first vehicle location, wherein the first network is a wireless communication network;
determine that the host vehicle has arrived at a second vehicle location after determining that the user device cannot connect to the first network;
storing in the memory a route of the host vehicle from the first vehicle location at which the user device in the host vehicle was connected to the first network to the second vehicle location at which the user device cannot connect to the first network; and
moving the host vehicle to the first vehicle location based on the route in response to the user device not connecting to a second network at a predetermined time.

13. The method of claim 12, further comprising:
transmitting a notification via the first network upon returning to the first vehicle location.

14. The method of claim 13, further comprising:
transmitting the notification to a preselected contact.

15. The method of claim 13, further comprising:
moving the host vehicle from the first vehicle location to the second vehicle location after transmitting the notification.

16. The method of claim 12, further comprising:
periodically storing locations at which the user device is connected to the first network while the host vehicle is driving;
detecting when the user device loses a connection to the first network; and
storing as the first vehicle location a last vehicle location at which the user device was connected to the first network before detecting the user device lost the connection for a predetermined time.

17. The method of claim 16, further comprising:
detecting a location at which the user device reconnects with the first network after losing the connection with the first network for the predetermined time; and
storing the location at which the user device reconnects with the first network as the first vehicle location.

18. The method of claim 17, further comprising:
periodically storing locations at which the user device is connected to the first network while the host vehicle is driving after detecting the location at which the user device reconnected to the first network;
detecting when the user device loses a connection to the first network; and
storing as the first vehicle location a last vehicle location at which the user device was connected to the first network before detecting the user device lost the connection for the predetermined time.

19. The method of claim 12, further comprising:
displaying information on a display device of the host vehicle after the predetermined time.

20. The method of claim 12, further comprising:
setting the predetermined time in response to an input from an occupant of the host vehicle.

* * * * *

UNITED STATES PATENT AND TRADEMARK OFFICE
CERTIFICATE OF CORRECTION

PATENT NO. : 11,360,486 B2
APPLICATION NO. : 16/461915
DATED : June 14, 2022
INVENTOR(S) : Oswaldo Perez Barrera It is certified that error appears in the above-identified patent and that said Letters Patent is hereby corrected as shown below:

In the Claims

Claim 10, Column 9, Line 47:   Replace "theft" with --the--; and
Claim 12, Column 10, Line 23:  Replace "determine" with --determining--.

Signed and Sealed this
Eighth Day of November, 2022

*Katherine Kelly Vidal*
Katherine Kelly Vidal
*Director of the United States Patent and Trademark Office*